US012715820B2

(12) United States Patent
Olsen et al.

(10) Patent No.: US 12,715,820 B2
(45) Date of Patent: *Aug. 25, 2026

(54) COATED GRANULAR FERTILIZERS AND METHODS OF MAKING COATED GRANULAR FERTILIZERS

(71) Applicant: Aqua Yield Operations, Inc., Sandy, UT (US)

(72) Inventors: Garrett Olsen, Sandy, UT (US); Mark Slavens, Sandy, UT (US)

(73) Assignee: Aqua Yield Operations, Inc., Sandy, UT (US)

( * ) Notice: Subject to any disclaimer, the term of this patent is extended or adjusted under 35 U.S.C. 154(b) by 785 days.

This patent is subject to a terminal disclaimer.

(21) Appl. No.: 18/064,800

(22) Filed: Dec. 12, 2022

(65) Prior Publication Data

US 2024/0190787 A1 Jun. 13, 2024

(51) Int. Cl.

| | |
|---|---|
| ***C05G 3/70*** | (2020.01) |
| ***A01C 21/00*** | (2006.01) |
| ***C05G 1/00*** | (2006.01) |
| ***C05G 3/60*** | (2020.01) |
| ***C05G 3/80*** | (2020.01) |
| ***C05G 5/30*** | (2020.01) |

(52) U.S. Cl.

CPC ................ *C05G 5/37* (2020.02); *A01C 21/00* (2013.01); *C05G 1/00* (2013.01); *C05G 3/60* (2020.02); *C05G 3/70* (2020.02); *C05G 3/80* (2020.02)

(58) Field of Classification Search

CPC ... C05G 5/37; C05G 3/70; C05G 3/80; C05G 1/00; C05G 3/60; A01C 21/00

See application file for complete search history.

(56) References Cited

U.S. PATENT DOCUMENTS 5,268,045 A 12/1993 Clare
5,538,531 A * 7/1996 Hudson .................... B01J 2/003 71/64.11
6,358,296 B1 * 3/2002 Markusch .......... C08G 18/7664 71/64.11
6,420,020 B1 7/2002 Yamakazi et al.

(Continued)

FOREIGN PATENT DOCUMENTS

EP 4317120 A1 2/2024
WO WO 2020115139 A1 6/2020

OTHER PUBLICATIONS

International Search Report dated May 10, 2024 for International Application No. PCT/US23/83652 prepared by the U.S. Searching Authority.

(Continued)

*Primary Examiner* — Wayne A Langel

(74) *Attorney, Agent, or Firm* — TechLaw Ventures, PLLC; Terrence J. Edwards

(57) ABSTRACT

A method of coating granular fertilizers for improved mechanical rigidity and delayed release of fertilizer compounds. The method includes preparing a solution that includes a first polymer that is water soluble and a second polymer comprising a copolymer. The method also includes adding a plurality of fertilizer granules to the solution and blending the solution until at least a portion of the plurality of fertilizer granules are coated with the first polymer and the second polymer.

21 Claims, 8 Drawing Sheets

(56) References Cited

U.S. PATENT DOCUMENTS

| | | | | |
|---|---|---|---|---|
| 7,682,656 | B2 * | 3/2010 | Xing | B01J 2/006<br>427/242 |
| 9,255,039 | B2 * | 2/2016 | Sanders | C05C 9/005 |
| 10,059,636 | B2 * | 8/2018 | Sanders | A01N 39/04 |
| 10,336,659 | B2 * | 7/2019 | Sanders | C08K 5/05 |
| 11,155,469 | B2 * | 10/2021 | Strömme | B01J 20/28064 |
| 2018/0228735 | A1 * | 8/2018 | Bein | A61K 47/12 |
| 2019/0218709 | A1 | 7/2019 | Ivy et al. | |
| 2020/0325082 | A1 | 10/2020 | Bunderson et al. | |
| 2021/0363073 | A1 | 11/2021 | Nguyen et al. | |
| 2022/0388927 | A1 * | 12/2022 | Kannan | B01J 2/30 |

OTHER PUBLICATIONS

English translation of DE596881 C (Dr Carl Padberg) May 14, 1934.

* cited by examiner

COATED GRANULAR FERTILIZERS AND METHODS OF MAKING COATED GRANULAR FERTILIZERS

TECHNICAL FIELD

The disclosure relates generally to methods, systems, and products for accelerating the establishment and growth of plants and other living organisms.

BACKGROUND

The agricultural industry, home-based growers, and other commercial growers commonly use fertilizers and other agricultural products to promote increased plant health and plant growth. Fertilizers include natural and synthetic materials that are applied to soil or to plant tissues to supply one or more plant nutrients essential to the growth of plants.

In many cases, it is desirable to store, transport, and apply fertilizers in a dry granular form. However, granular fertilizers are prone to breakage and degradation when moved through heavy equipment and jostled repeatedly. Thus, granular fertilizers experience a relatively short degradation period when used for commercial farming applications. Additionally, in many cases, it is desirable to apply multiple fertilizers and other agricultural products in a single application. Specifically, in some implementations, it is desirable to include a wetting agent or other compound configured to improve soil water retention when also applying fertilizers to the soil.

However, traditional fertilization systems and composition do not provide an effective means to increase mechanical rigidity of granular fertilizers while also providing an efficient means to apply additional agricultural compounds, such as wetting agents, growth regulators, nanoparticles, and other nutrients.

In view of the foregoing deficiencies in current fertilization methods, disclosed herein are compositions, methods, and systems for coating granular fertilizers and enabling coated particles to include multiple fertilizers or agricultural products.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
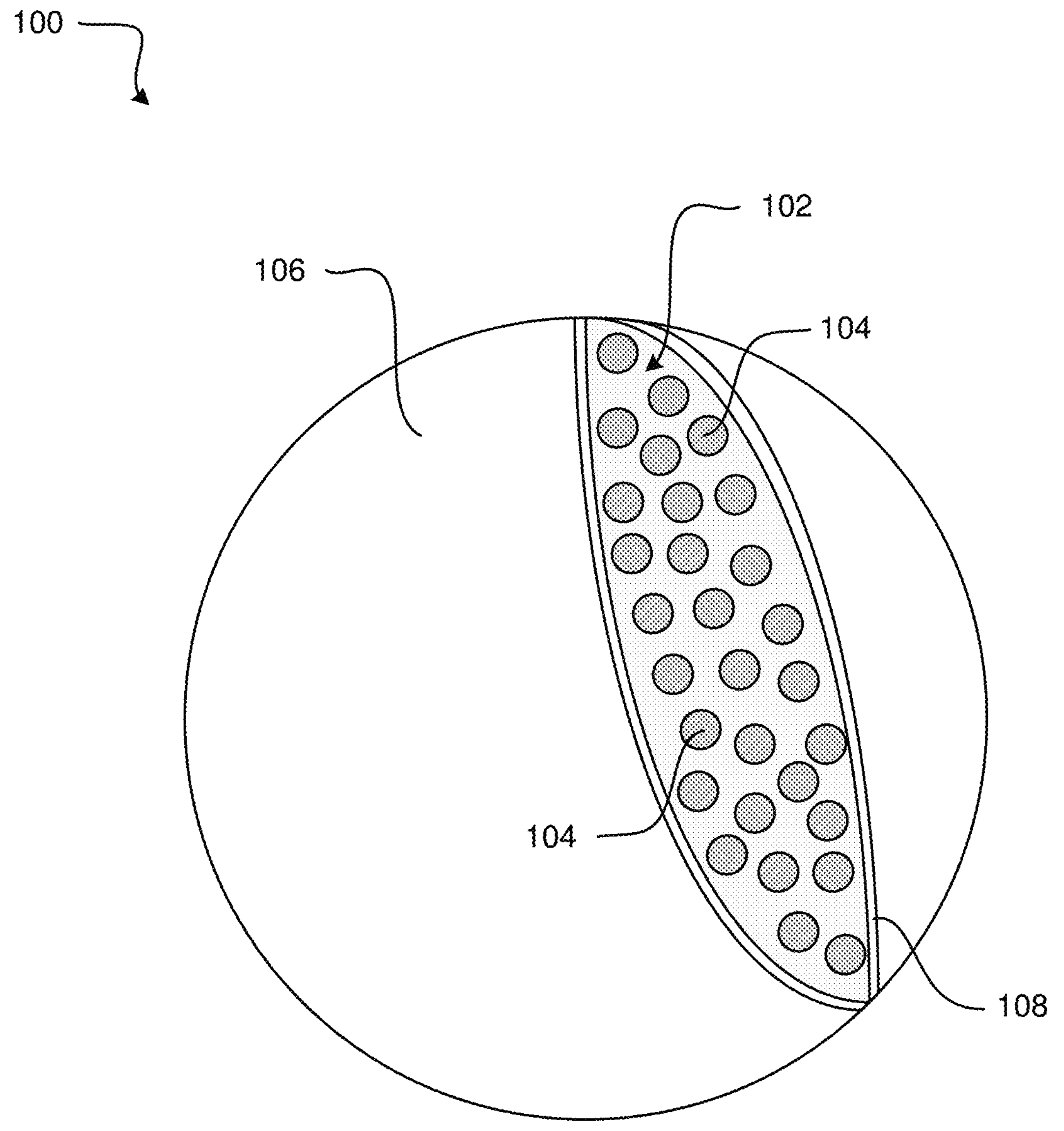
FIG. 1 is a schematic illustration of a perspective view of a coated particle with a portion of a coating cut away to reveal an inner particle disposed therein.

Disclosed herein are compositions, methods, and systems for efficient delivery of agricultural products for accelerating the establishment and growth of plants and other living organisms. Specifically, disclosed herein is a coated particle comprising an inner particle and a coating. The coating consists of a two-stage polymer coating configured to improve soil water retention, serve as a carrier for particles protected by the coating, and increase mechanical rigidity of granular fertilizer components.

The coated particles described herein enable the creation of novel combinations of fertilizers and other agricultural products. The coated particle includes an inner particle that may include several different fertilizers and other agricultural products, including compound fertilizers, combinations of different fertilizers, and fertilizers in combination with, for example, pesticides, plant growth regulators, nanoparticles microbes, fungicides, herbicides, and so forth. In some cases, the coated particles described herein are configured to protect ion exchange nanoparticle compounds that comprise fertilizer ions disposed within a nanoparticle carrier particle.

The coated particles described herein may be used in cases where the granular fertilizers themselves produce an undesirable amount of dust, or when applying those fertilizers produces an undesirable amount of dust arising from dry soil. The two-stage polymer coating described herein is configured to mitigate dust creation during processing, transporting, and application of granular fertilizers.

A coated particle described herein includes an inner particle comprising a fertilizer granule and a coating disposed on a surface of the inner particle. The coating includes a first polymer selected from any class of organic and water-soluble polymers. The coating further includes a second polymer comprising a copolymer.

The two-stage polymer coating described herein may be infused with additional agricultural components, such as herbicides, fungicides, plant growth regulators, pesticides, microbes, and nanoparticles. In some implementations, the two-stage polymer coating further includes an ion exchange nanoparticles as described herein, which may include nanoparticulate fertilizer ions attracted to a carrier particle. The two-stage polymer coating may protect various inner particles, which may specifically include granular fertilizer components that may be easily broadcast over cross in a dry form.

A method of manufacturing a coated particle as described herein includes preparing a first polymer solution comprising water and a first polymer. The first polymer includes any class of organic and water-soluble polymer, and may include polyvinyl alcohol (PVA). The method further includes preparing a second polymer solution including water and a second polymer. The second polymer may include a copolymer, such as a block chain copolymer or branched polymer. The method includes combining the first polymer solution and the second polymer solution to generate a coating solution. In some implementations, the method includes adding additional agricultural products to the coating solution, such as herbicides, pesticides, plant growth regulators, fungicides, microbes, weed killers, or nanoparticles. The method includes adding a plurality of fertilizer granules to the coating solution. The method includes blending the solution until at least a portion of the plurality of fertilizer granules are coated with the first polymer and the second polymer, and then dehydrating the solution to generate dry coated granular particles comprising a two-stage polymer coating.

For the purposes of promoting an understanding of the principles in accordance with the disclosure, reference will now be made to the implementations and embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

This disclosure is not limited to the configurations, process steps, ingredients, and materials disclosed herein as such configurations, process steps, ingredients, and materials may vary somewhat. The terminology employed herein is used for the purpose of describing embodiments and implementations only and is not intended to be limiting since the scope of the disclosure will be limited only by the appended claims, if any, and equivalents thereof.

In describing and claiming the subject matter of the disclosure, the following terminology will be used in accordance with the definitions set out below.

It must be noted that, as used in this specification and the appended claims, if any, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "synthetic" includes "wholly synthetic" compounds, solutions, and substances and "partially synthetic" compounds, solutions, and substances. A wholly synthetic compound, solution, or substance is entirely generated or synthesized in a laboratory, whereas a partially synthetic compound, solution or substance is chemically altered from its natural or native state. By way of example, a wholly synthetic structural particle may be a crystalline structure that is generated or synthesized in a laboratory setting from non-crystalline molecules and ions. By way of further example, a partially synthetic structural particle may be a crystalline structure that is a native mineral that has been chemically altered in a laboratory. It will be appreciated that the laboratory may be a mobile laboratory or a stationary factory or laboratory without departing from the scope of the disclosure.

As used herein, the phrase "agricultural products" refers broadly to molecules, ions, compounds, solutions, and substances used to protect plants, such as pesticides, molecules, ions, compounds, solutions, and substances used to kill plants, such as herbicides, and molecules, ions, compounds, solutions, and substances used as plant growth regulators, such as those used to promote plant health, fruiting, growth, or those used to slow plant growth.

As used herein, "nanoparticle" or "nanoparticle size" includes an average compound or element size having a diameter in any one dimension that is 100 nanometers or less. As used herein, "submicron particle" or "submicron particle size" includes an average compound or element size having a diameter in any one dimension that is within a range of about 101 nanometers to about 1000 nanometers.

As used herein, "effective amount" means an amount of a component of a fertilizer, an agricultural product, or other compound or element sufficient to provide nutrition to a plant, or sufficient to effectuate the desired response and performance, including killing a plant or undesirable organism, at a reasonable benefit/risk ratio attending any agricultural product, compound and/or composition. For example, an effective amount of a fertilizer compound is an amount sufficient to promote the optimal or desired maturation of plants. An effective amount of a phyllosilicate or tectosilicate or a structural particle having a high ion exchange capacity is an amount sufficient to deliver an effective amount of fertilizer or agricultural product through exchange of native ions 206 on the mineral particles with selected ions/molecules of an agricultural product such as fertilizer. Further, the effective amount of the phyllosilicate or tectosilicate or structural particle must be sufficient to hold and deliver enough selected ions and molecules in an agricultural product to result in promoting the optimal or desired maturation of plants. In an implementation, depending upon the desired ion of an agricultural product to be delivered to the plant cell, the quantity of ions may be more than two orders of magnitude and up to, and including, seven orders of magnitude more than available ion exchange sites within the phyllosilicate or tectosilicate structural particle. It will be appreciated that selected ions, such as fertilizer or agricultural product, may be present without departing from the scope of the disclosure.

It will be understood that matching fertilizer and/or agricultural product type and application rates to satisfy a plant's need is an essential component of optimizing plant production. However, different plants in different soil environments, each having different soil types and pHs and other environmental factors, will require varying rates of the major fertilizer nutrients, which include nitrogen (N), phosphate ($P_2O_5$), and potassium (potash, $K_2O$). Plants also require secondary nutrients, including Sulphur (S), Calcium (Ca), and Magnesium (Mg), though in lesser quantities than the primary nutrients. Micronutrients are also considered essential though they are needed in still lesser quantities. Micronutrients include Chlorine (Cl), Manganese (Mn), Iron (Fe), Zinc (Zn), Copper (Cu), Molybdenum (Mo), and Nickel (Ni). Another element that is not considered essential but is beneficial is Silicon (Si). Thus, due to variations in soil types, soil test nutrient levels, and nutrient ranges of different plants, different fertilizers, agricultural products, and application rates may be required. Still further, the methods, compositions and agricultural products disclosed herein may further affect the application rates, such that less fertilizer and/or agricultural product may be used to effectuate a response in or deliver the desired result to a plant. In any case, to optimize plant production, a plant's need for nitrogen, phosphate, and potassium (sometimes abbreviated to N—P—K) nutrients along with the other essential and beneficial nutrients must be met without over application. Thus, it will be appreciated that the disclosure may utilize any of these nutrients in any number of possible blends of fertilizer and/or agricultural product types to give the correct N—P—K and other nutrient ratio for a given plant or plant. It should also be understood that ions and molecules listed above along with other elements, ions, and molecules may be used to kill or limit growth in plant material or other organisms such as insects, bacteria, fungi, viruses, and other organisms by altering the dosage such that it is toxic to those organisms. For example, Manganese levels of 25 to 200 ppm in citrus leaf tissues are considered adequate while levels above 1000 ppm may result in toxicity. In an implementation, the form of the fertilizer is a liquid fertilizer or combination of fertilizer and other beneficial molecules that promote plant health and growth in a liquid form. It will be understood that in an embodiment the effective amount of liquid fertilizer may fall within a range of about 0.10 gallons to about 250 gallons per 250 gallons of finished liquid product without departing from the scope of the disclosure. In an embodiment, for dry, water-soluble products, the dry product may fall within a range of about 0.01 pounds to 1000 pounds per 250 gallons of finished liquid product.

Referring now to the figures, FIG. 1 is a perspective view of a cutaway illustration of a coated particle 100. The coated particle 100 includes an inner particle 102 comprising a plurality of agricultural particles 104. The inner particle 102 is surrounded by a coating 106. The coating 106 is partially cut away in FIG. 1 to reveal the inner particle 102 disposed underneath the coating 106. The coating 106 has a coating thickness 108 which may vary depending on the implementation.

The coated particle 100 is configured as an agricultural product comprising one or more of a fertilizer, pesticide, fungicide, weed killer, herbicide, microbe, plant growth regulator, nanoparticle, and so forth. The coated particle 100 may be applied to soil when the coated particle 100 is in a dry granular state, or when the coated particle 100 is dissolved in water. When the coated particle 100 is in contact with water after a wetting event, such as rainfall or irrigation, the coating 106 degrades, and the inner particle 102 disposed therein is released into the soil and made available for uptake by a plant.

The coating 106 serves as an inclusion vessel that protects the inner particle 102. The coating 102 includes a flexible polymer coating and may specifically include a two-stage polymer coating as described herein. The two-stage polymer coating improves water retention within soil and serves as a carrier for the inner particle 102. Additionally, the coating 106 improves the structural and mechanical robustness of the fertilizer granules making up the inner particle 102. The coating 106 serves to protect the fertilizer granules of the inner particle 102 to ensure they can survive vigorous movements during manufacturing, transport, and application.

The coating 106 may specifically include a first polymer configured to improve water retention within soil. The coating 106 may additionally include a second polymer configured to serve as a carrier for the inner particle 102. The first polymer may specifically include polyvinyl alcohol polymer (may be referred to as PVA or PVCH). PVA is water-soluble synthetic polymer with the formula $[CH_2CH(OH)]_n$. PVA is an atactic material that exhibits crystallinity. In terms of microstructure, PVA is composed mainly of 1,3-diol linkages and some 1,2-diol linkages. PVA biodegrades slowly and increase water retention in soil.

The second polymer of the coating 106 is selected to serve as an effective carrier for the inner particle 102. The second polymer may specifically include polyoxyalkylene, which is a block copolymer made from sequential block polymerizations of ethylene oxide, propylene oxide, and 1,2-butylene oxide. The second polymer may include any polymer that may be used as a coating as described herein. The second polymer may specifically include a reverse block copolymer, block copolymer, branched polymer, or other type of polymer suitable for the application.

As discussed above, the second polymer of the coating 106 may be selected from a class consisting of block copolymers. Block copolymers comprise two or more homopolymer subunits linked by covalent bonds. Additionally, the second polymer of the coating 106 may be selected from a class consisting of branched polymers or branched chain polymers. Branched polymers include side chains or branches growing from a main chain. Branched polymers include graft polymers, star-shaped polymers, comb polymers, brush polymers, polymer networks, and dendrimers. Branched polymers include starch, glycogen, and low-density polyethylene.

In some cases, the coating 106 molecules are attracted to at least a portion of the plurality of agricultural particles 106 of the inner particle 102. The coating 102 may be attracted to components of the inner particle 102 through one or more of van der Waals forces, quantum attraction, or London dispersion forces. During manufacturing, the inner particle 102 molecules and the coating 106 molecules enter chemical equilibrium and become thermodynamically stable in the coated particle 100 configuration. In some cases, the ratio of inner particle 102 molecules and coating 106 molecules is optimized to ensure thermodynamic stability of the coated particle 100.

The coating thickness 108 is variable depending on the implementation and may be optimized depending on one or more of the type of inner particle 102 disposed within the coating 106, the agricultural use of the coated particle 100, the desired degradation time for the coated particle 100, and so forth. The coating thickness 108 will vary depending on the types of polymers selected for the coating 106. The coating thickness 108 may be increased when the coated particle 100 is expected to undergo extensive mechanical or physical manipulation, for example, when being transported, tumbled, or applied to soil. The coated particle 100 may be transported on conveyer belts, tumbled during manufacture, transported in trucks, distributed to soil through heavy duty mixers, and so forth. The coating thickness 108 may be optimized to provide increased rigidity and mechanical strength to withstand this mechanical agitation.

The inner particle 102 is made up of one or more agricultural particles 104 and is typically made up of many individual agricultural particles 104. The agricultural particles 104 include, for example, one or more of organic fertilizer molecules, inorganic fertilizer ions, plant growth regulator molecules, pesticides, herbicides, fungicides, microbes, nanoparticles, ion exchange nanoparticles as described herein (see, for example, FIG. 2 and associated description), multiple ion nanoparticles, and so forth. The inner particle 102 collectively refers to the one or more components protected by the coating 106.

In an example implementation, the inner particle 102 includes one or more fertilizers for effectuating a desired result in a plant. The fertilizer disposed within the coating 106 may include organic fertilizers or inorganic fertilizers. The organic fertilizers include nutrients derived from plants or animals, such as agricultural waste, animal waste, household waste, industrial waste, minerals, or sludge. The inorganic fertilizers include chemical fertilizers containing nutrients for improving the growth of plants. The inorganic fertilizers may include nitrogenous fertilizers, phosphate fertilizers, potassium fertilizers, compound fertilizers, or complete fertilizers.

The inner particle 102 may include one or more nitrogenous fertilizers. Nitrogen fertilizers contain nitrogen necessary for crop growth. Nitrogen is a main component of chlorophyll, which maintains balance during photosynthesis. Nitrogen is also part of plant amino acids and forms proteins, and thus, the use of a nitrogenous fertilizer improves the yield and quality of agricultural products. The nitrogenous fertilizers included within the inner particle 102 may include nitrate, ammonia, and ammonium salts. Specifically, the nitrogenous fertilizers may include one or more of sodium nitrate, ammonium sulfate, ammonium nitrate (AN), ammonium sulphate nitrate, ammonium chloride, urea, urea ammonium nitrate (UAN), calcium nitrate, Chilean nitrate, anhydrous ammonia, or calcium ammonium nitrate (CAN).

The inner particle 102 may include one or more phosphate fertilizers. Phosphorous is found in the protoplasm of a plant cell and plays a role in cell growth and proliferation. Thus, phosphorous is beneficial for the growth of plant roots. Phosphorous fertilizers present within the inner particle 102 may include one or more of single superphosphate (SSP), triple superphosphate (TSP), monoammonium phosphate (MAP), di-ammonium phosphate (DSP), or ammonium polyphosphate.

The inner particle 102 may include one or more potassium fertilizers. Potassium fertilizers may specifically be selected to be applied to soils deficient in potash. Potassium fertilizers may include muriate of potash (potassium chloride) or sulphate of potash (potassium sulphate). Muriate of potash is a crystalline material including potash ($K_2O$). Sulphate of potash dissolves readily in water and also includes potash ($K_2O$).

The inner particle 102 may include one or more secondary plant nutrients, such as calcium, magnesium, or sulfur. Sulphur may be added to nitrogenous fertilizers such as ammonium nitrate or urea. Other sulfur sources include single superphosphate (SSP). Potassium sulphate (SOP), and potassium magnesium sulphate (Kainite). Magnesium may be supplied in the form of Kieserite, which is a magnesium sulphate mineral used in agriculture to correct magnesium deficiencies. Calcium may be included within the inner particle 102 in the form of calcium nitrate, gypsum (calcium sulphate), or lime/dolomite (calcium carbonate).

The inner particle 102 may include one or more micronutrient fertilizers such as iron, manganese, boron, zinc, and copper. The inner particle 102 may additionally include one or more inhibitors, such as nitrification inhibitors that delay the nitrification of ammonium by suppressing the activity of *Nitrosomonas* bacteria in the soil. The inner particle 102 may additionally include urease inhibitors which include chemical compounds configured to delay the first step of degradation of urea in the soil, which include the hydrolysis that creates $NH_3$ emissions.

The inner particle 102 may include one or more compound fertilizers, which include two or more plant nutrients that are delivered to the plant simultaneously. For example, when soil is deficient in both nitrogen and phosphorous, the inner particle 102 may include a compound fertilizer such as amorphous to deliver nitrogen and phosphate simultaneously. Specifically, the inner particle 102 may include a "complete fertilizer" including nitrogen, phosphorous, and potassium.

The inner particle 102 may include a combination of fertilizers and one or more of insecticides, fungicides, or weed killers. The inner particle 102 may specifically include weed killers such as DDT (dichlorodiphenyltrichloroethane), BHT, mercury salts, copper salts, or 2, 4-D.

The inner particle 102 may additionally include one or more plant growth regulators (PGRs). Plant growth regulators include chemicals used to modify plant growth, such as increasing branching, suppressing shoot growth, increasing return bloom, removing excess fruit, altering fruit maturity, and so forth. Plant growth regulators that may be included in the inner particle 102 may include auxins, gibberellins, cytokinin, abscisic acid, and ethylene.

Figure 2:
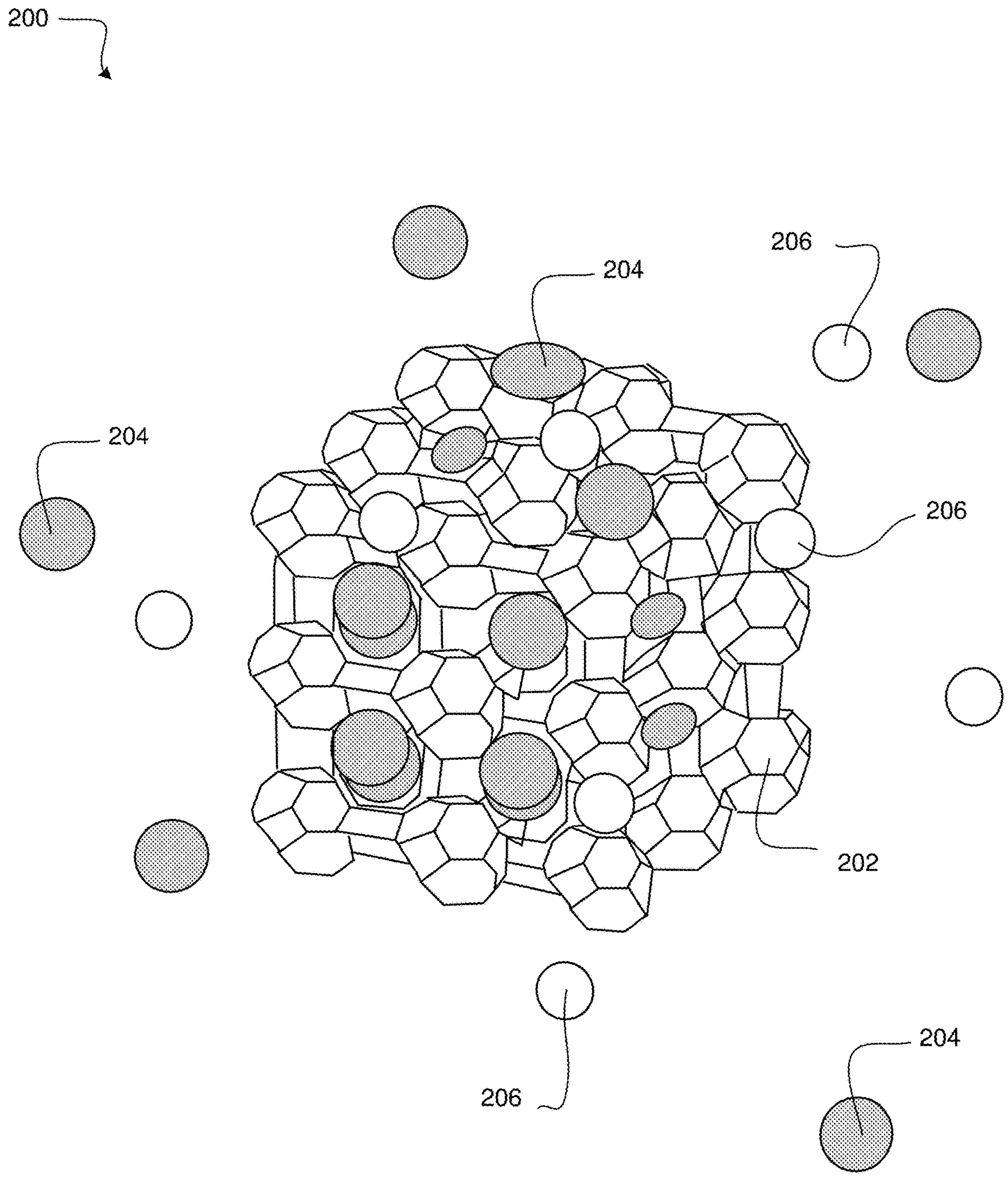
FIG. 2 is a schematic illustration of a nanoparticle including a structural particle and a plurality of selected ions.

FIG. 2 is a perspective view of a schematic illustration of an ion exchange nanoparticle 200. In some implementations described herein, the inner particle 102 includes ion exchange nanoparticles 200 such as the one described in FIG. 2. The nanoparticle 200 includes a structural particle 202 arranged in a crystalline structure as illustrated in FIG. 2 or some other multiple-particle structure. The nanoparticle 200 further includes a plurality of native ions 206 to be exchanged with a plurality of selected ions 204.

The structural particle 202 may include, for example, clay, zeolite, or another mineral. The structural particle 202 includes a plurality of cation exchange sites and may have a high cation exchange capacity (CEC). The structural particle 202 is deemed to have a high cation exchange capacity if the structural particle 202 comprises 10 centimoles of charge per kilogram (cmolc/kg) or more available for exchange. The structural particle 202 includes one or more native ions 206 that are attracted to the cation exchange sites. The structural particle 202 is processed to synthesize the ion exchange nanoparticle 200 by causing the one or more native ions 206 to exchange with one or more selected ions 204. The one or more selected ions 204 may include suitable fertilizer ions or agricultural product ions, including those discussed in connection with FIG. 1. After processing, the nanoparticle 200 includes a shell formed by the structural particle 202 and further includes a plurality of selected ions 204 attracted to the cation exchange sites formed by the structural particle 202. In a perfect implementation, each of the native ions 206 is exchanged with a known ion 204.

The nanoparticle 200 is applied to plants and enables improved uptake of fertilizer and/or agricultural products by the plants when compared with traditional methods. The structural particle 202 of the nanoparticle 200 enables the plants to absorb the fertilizer ions more efficiently and thereby increases the effectiveness of fertilizing the plants.

The nanoparticle 200 can pass through a plant's cell walls and be absorbed by the plant. The nanoparticle 200 increases the absorption of the one or more selected ions 204 that have taken the place of the one or more native ions 206 attracted to the structural particle 202, and this enables the ion exchange nanoparticle 200 to deliver the one or more selected ions 204 to the plant. The structure of the nanoparticle 200 can enter the plant cells and deliver each of the unique fertilizer ions to the plant and increase the plant's fertilizer uptake of the delivered fertilizer ions.

Ion exchange (cation exchange or anion exchange) is a chemical process where ions are exchanged between two electrolytes or between an electrolyte solution and a complex. This process includes both cations (ions with a positive charge) and anions (ions with a negative charge). Ion exchangers (complexes) can include synthetic gel polymers or natural substances. It will be appreciated that the structural particle 202 of the disclosure is the complex. Ion exchange on a complex occurs when preexisting ions on a complex are released in exchange for the binding of ions that have a higher affinity for the complex. This process can be reversed by introducing a saturated solution of the lower affinity ions to the complex.

The structural particle 202 may be in the consolidated or aggregate form. In an implementation, the structural particle 202 is a zeolite of the zeolite group in the tectosilicate family and can be naturally occurring or synthetically derived. Zeolites are crystalline, hydrated aluminosilicates that contain alkali and alkaline-earth metals. Their crystal framework is based upon a three-dimensional network of SiO4 tetrahedra with all four oxygens shared by an adjacent tetrahedral. The alkali and alkaline earth cations are loosely bound within this structure (by ionic bonding) and can be exchanged by other cations or molecular water. Most zeolites can be dehydrated and rehydrated without any change in volume. The important physical and chemical properties of zeolites are high degree of hydration, low density and large void volume when dehydrated, cation exchange properties, uniform molecular-sized channels in the dehydrated crystals, ability to adsorb gases and vapors, and catalytic properties.

Figure 3:
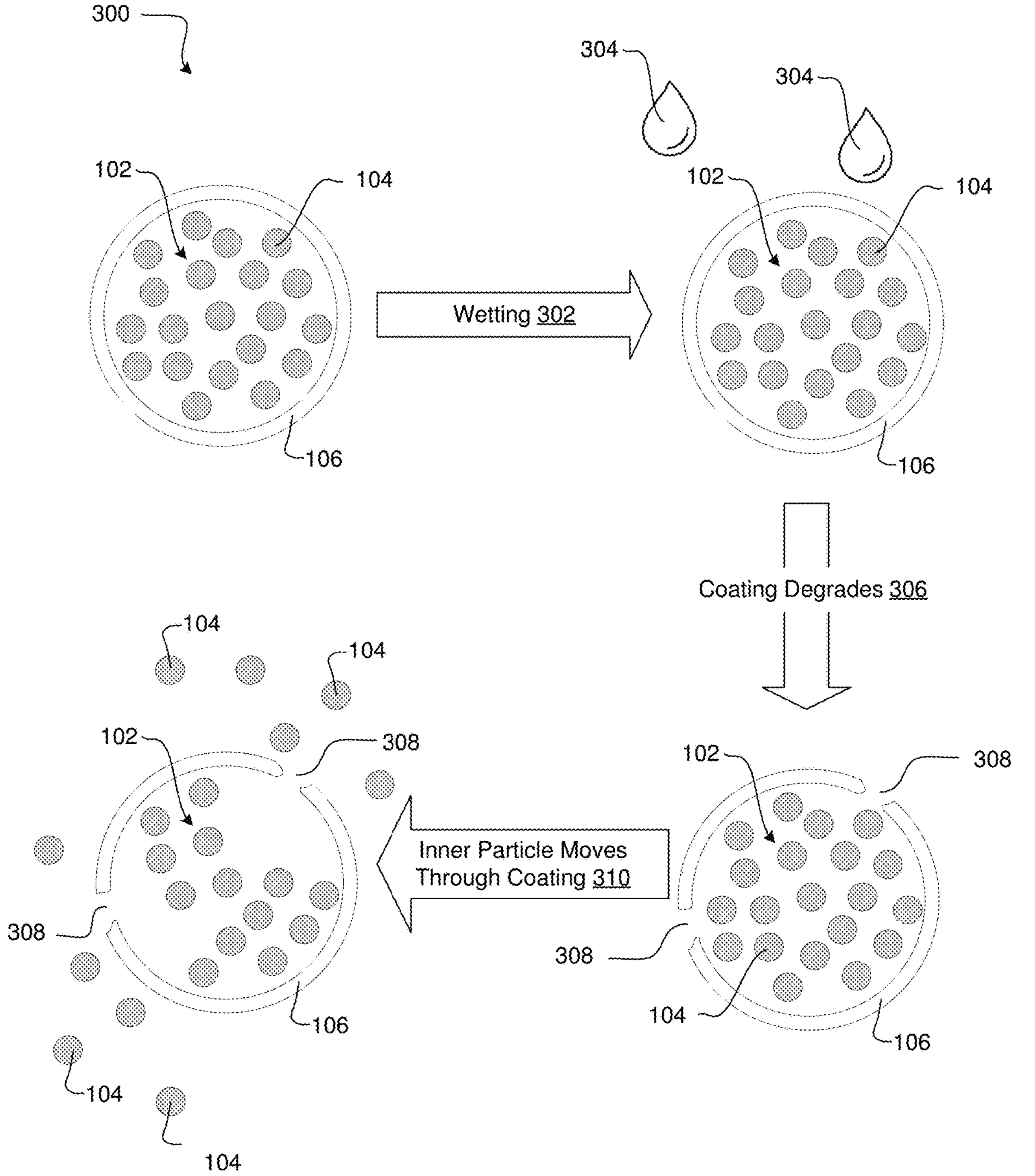
FIG. 3 is a schematic flow chart illustrating an example process for degradation of a coated granular fertilizer particle.
Figure 4:
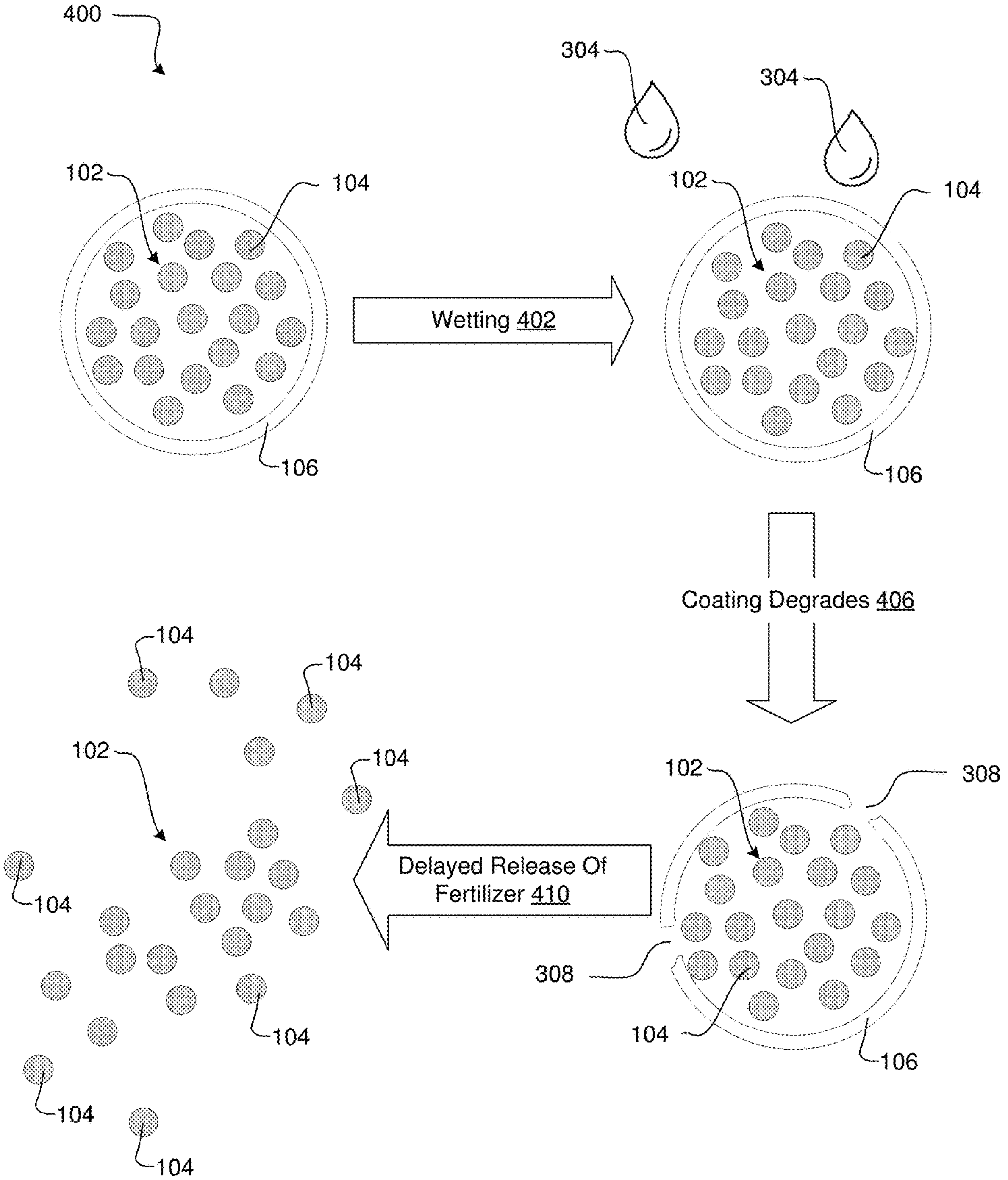
FIG. 4 is a schematic flow chart illustrating an example process for degradation of a coated granular fertilizer particle.

FIGS. 3 and 4 are schematic diagrams of example processes 300, 400 for degradation of a coating 106 to release components of an inner particle 102. The coated particles 100 are illustrated with a cross-sectional view illustrating the plurality of agricultural particles 104 of the inner particle 102 surrounded by the coating 106. FIG. 3 illustrates a process 300 wherein the coating 106 does not fully degrade and FIG. 4 illustrates a process 400 wherein the coating 106 fully degrades.

The inner particles 102 depicted in FIGS. 3 and 4 are illustrated with numerous independent agricultural particles 104. It should be appreciated that the inner particle 102 may include a plurality of different types of agricultural particles 104. Additionally, the agricultural particles 104 may be bonded or attracted to one another to form a cohesive particle unit surrounded by the coating. Additionally, the inner particles may include nanoparticles 200 as discussed at least in connection with FIG. 2. The inner particles 102 may include a combination of different fertilizers or agricultural products and may specifically include ion exchange nanoparticles 200 combined with other agricultural products, such as pesticides, herbicides, plant growth regulators, fungicides, and so forth.

The process 300 illustrated in FIG. 3 begins with a coated particle 100 including an inner particle 102 comprising a plurality of agricultural particles 104. The inner particle 102 is surrounded by a coating 106. The coated particle 100 undergoes a wetting 302 event, wherein the coated particle 100 is exposed to water 304. The coating 106 degrades at 306 to form elution holes 308 within the coating 106. The inner particle 102 then moves through the elution holes 308 disposed within the coating 106 at 310. In the example illustrated in FIG. 3, the agricultural particles 104 (in most cases, fertilizer ions) of the inner particle 102 dissolve in the water 304 and move through the elution holes 308 of the coating 106. The agricultural particles 104 may then be taken up by a plant.

The process 400 illustrated in FIG. 4 begins with the coated particle 100 undergoing a wetting 402 event, wherein the coated particle 100 is exposed to water 304. The coating 106 degrades at 406 by forming elution holes 308 over time. Eventually, the coating 106 fully disintegrates and the fertilizer within the inner particle 102 is released to the surrounding. The agricultural particles 104 may then be taken up by a plant root system.

Figure 5:
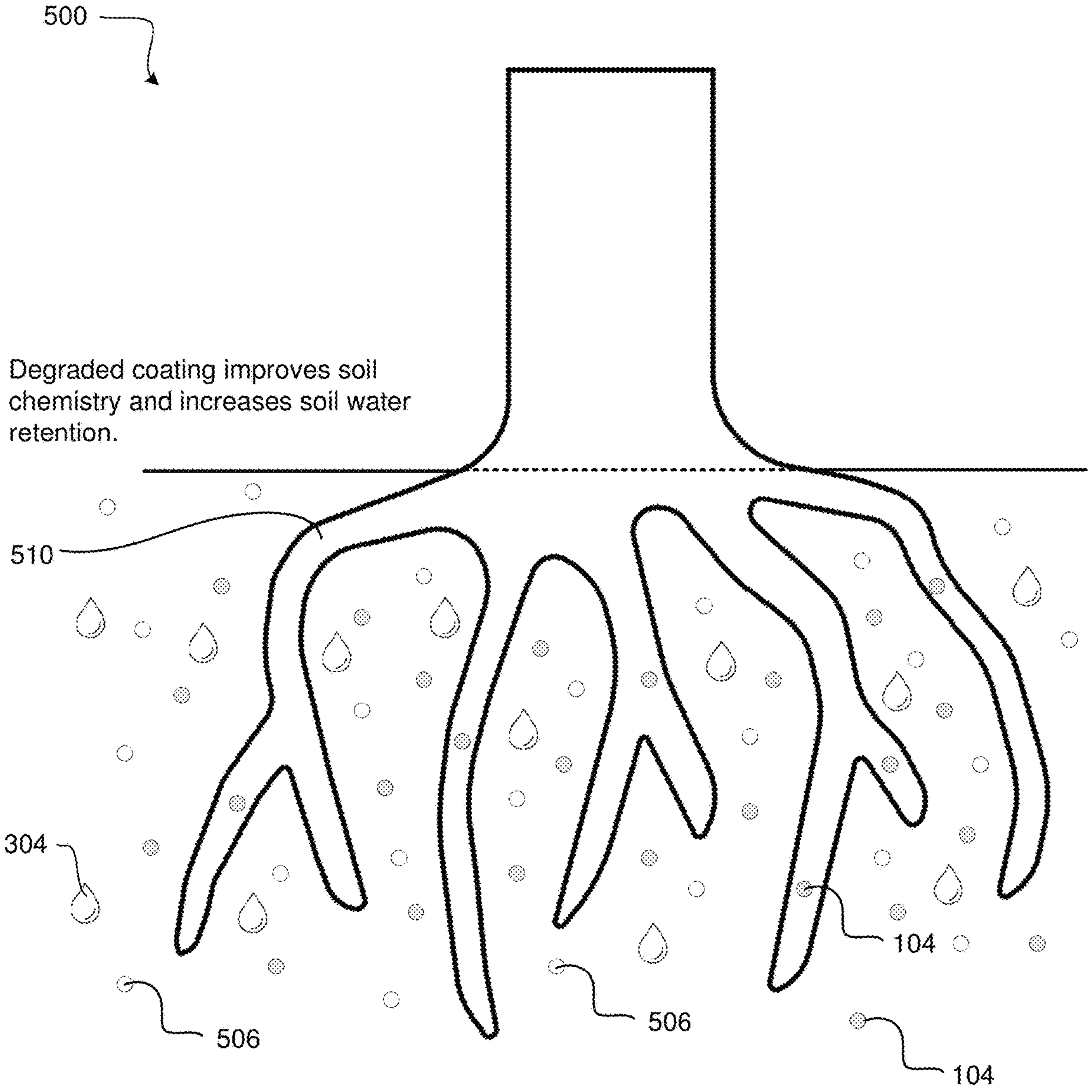
FIG. 5 is a schematic illustration depicting soil composition and a plant root system after applying a coated particle as described herein.

FIG. 5 is a schematic illustration depicting soil chemistry and a plant 510 root network after applying a coated particle 100 as described herein. The coated particle 100 may be stored and applied in a dry granular form. After the coated particle 100 is applied, the coated particle 100 eventually experiences its first wetting event, which may include natural precipitation, irrigation wetting, and so forth. When the coated particle 100 undergoes a wetting event, the coating 106 degrades and releases coating molecules 506 into the soil. The coating molecules 506 may include the first polymer (which may specifically include polyvinyl alcohol) and may further include the second polymer. Additionally, the coated particle 100 releases the agricultural particles 104 of the inner particle 102 into the surrounding soil.

In the schematic illustration depicted in FIG. 5, the coating molecules 506 are illustrated with white dots and the agricultural particles 104 are illustrated with grey dots. As shown in FIG. 5, each of the coating molecules 506 and the agricultural particles 104 are dispersed through the soil. Most of the coating molecules 506 remain in the soil, and some coating molecules 506 may be taken up by the plant 510. The agricultural particles 104 are configured to be taken up by the plant 510 by way of the root system as shown in FIG. 5.

The plant 510 takes up at least a portion the agricultural particles 104 by way of its root system. If the agricultural particles 104 include nanoparticles 200 as described herein, then the plant 510 may accept the entire nanoparticle 200 structure or may separately accept the selected ions 204 and/or native ions 206 associated with the nanoparticle 200. The structure of the nanoparticle 200 enables delayed release of the selected ions 204 over time to improve plant outcomes and reduce the total quantity of fertilizer needed to effectuate a desired result in the plant 510. The nanoparticle 200 does not bind to the soil and remains in solution when dispersed throughout the soil. This enables the nanoparticle 200 to be readily absorbed by the root system of the plant 510 as the plant absorbs water 304. The nanoparticle 200 can pass through the cell walls of the plant and thereby deliver the fertilizer ions (selected ions 204) to the plant. This provides increased fertilizer uptake when compared with conventional methods.

At least a portion of the coating molecules 506 remain in the soil as shown in FIG. 5. The presence of the coating molecules 506 improves soil chemistry and increases soil water 304 retention. The schematic illustration depicted in FIG. 5 shows that the water 304 molecules remain dispersed throughout the soil and retained in the soil over time. At least a portion of the coating molecules 506 serve as a wetting agent and improve water retention within the soil.

Specifically, the polyvinyl alcohol (PVA) of the coating 106 may be released into the soil and serve to improve water retention within the soil. PVA is an effective stabilizer of surface soils when the structural organization of the soil is maintained by soil organic matter. In some implementations, the presence of the coating molecules 506 (and specifically the PVA) can double the soil's acceptance of water 304. The presence of the coating molecules 506 within the soil thereby reduces the total amount of water that must be provided to the plant 510 to ensure desirable growth outcomes for the plant. Additionally, the presence of the coating molecules 506 within the soil reduces the likelihood that the soil will dry out and cause dust issues or other environmental concerns.

Figure 6:
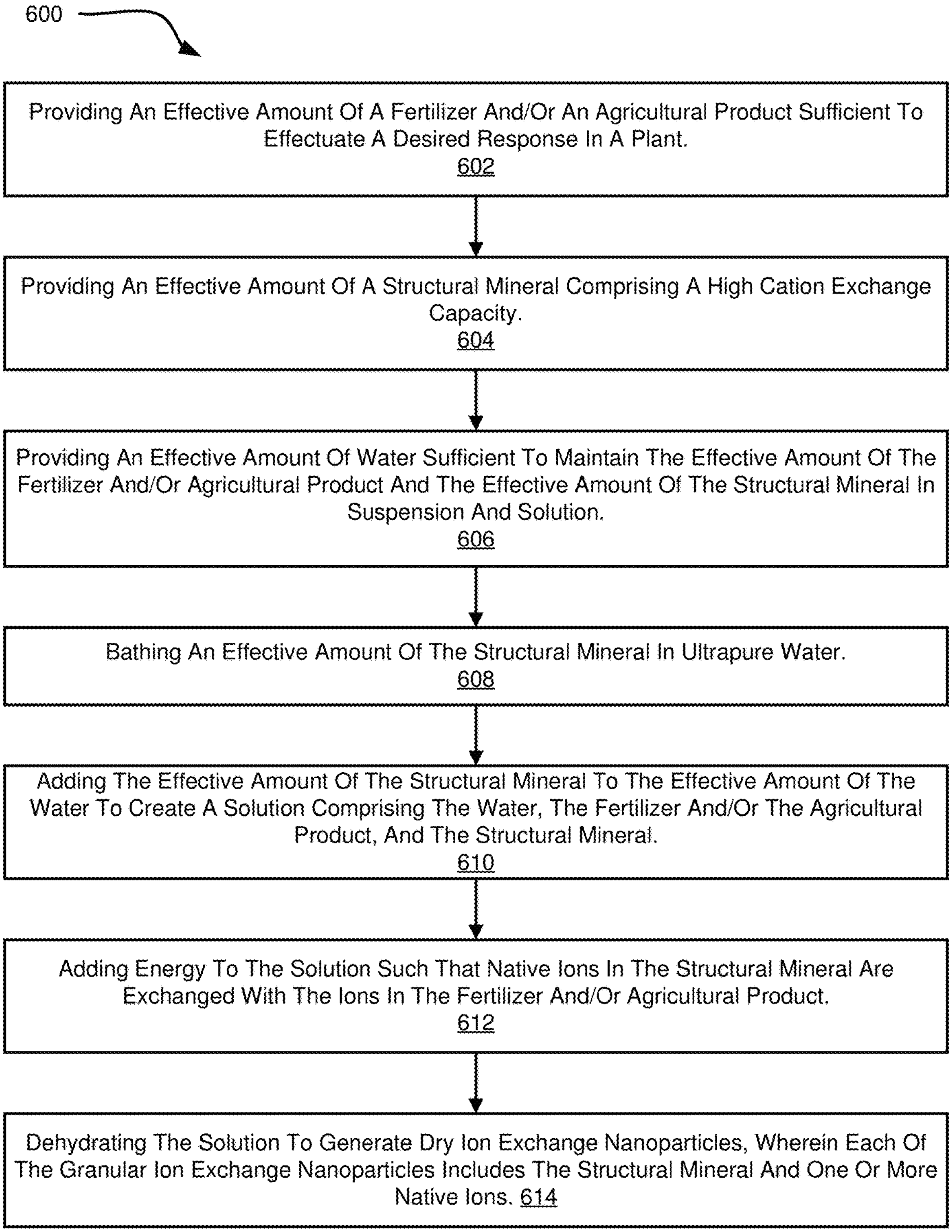
FIG. 6 is a schematic flow chart diagram of a method for manufacturing a nanoparticle that may be disposed within a coated particle.

FIG. 6 is a schematic flow chart diagram of a method 600 for producing a synthetic agricultural product such as a dry ion exchange nanoparticle 200 as described herein. The method 600 may be performed prior to producing a coated particle 100 as described herein, such that the resultant granular ion exchange nanoparticle may be disposed within the coated particle 100 as a component of the inner particle 102.

The method 600 includes providing at 602 an effective amount of a fertilizer and/or an agricultural product sufficient to effectuate a desired response in a plant. The method 600 includes providing at 604 an effective amount of a structural particle 202 comprising a high cation exchange capacity. The method 600 includes providing at 606 an effective amount of water sufficient to maintain the effective amount of the fertilizer and/or agricultural product and the effective amount of the structural particle 202 in suspension and solution. The method 600 includes bathing at 608 an effective amount of the structural particle 202 in ultrapure water. The method 600 includes adding at 610 the effective amount of the structural particle 202 to the effective amount of the water to create a solution comprising the water, the fertilizer and/or the agricultural product, and the structural particle 202. The method 600 includes adding at 612 energy to the solution such that the native ions 206 in the structural particle 202 are exchanged with the ions in the fertilizer and/or agricultural product. The method 600 includes dehydrating at 614 the solution to generate dry ion exchange nanoparticles 200. Each of the dry ion exchange nanoparticles 200 includes the structural mineral and one or more of the native ions 206. The resultant dry ion exchange nanoparticle 200 may then be used a component of the inner particle 102 as described herein.

The method 600 of generating the dry ion exchange nanoparticle 200 may include providing an effective amount of a structural particle 202 that comprises a high cation exchange capacity. Cation exchange capacity may be determined by calculating a value that is an estimate of a substance's ability to attract, retain, and exchange cation elements. Cation exchange capacity is reported in milliequivalents (meq) per 100 grams of a substance, which may be a soil substance, structural particle 202, or other inorganic matter (meq/100 g). A meq is the number of ions that total a specific quantity of electrical charges. For example, a meq of potassium ($K^+$) ions is approximately $6\times10^{20}$ positive charges; whereas with calcium a meq of Calcium ($Ca^{++}$) is also $6\times10^{20}$ positive charges, but only $3\times10^{20}$ ions because each calcium ion has two positive charges. Although the minerals discussed here have high cation exchange capacity values, they do have a level of anion exchange capacity as well and the anion exchange can be utilized in the same way as the cation exchange. The number of cations supplied by the fertilizer and/or agricultural product source should outnumber the number of cations occurring naturally on the structural particle 202, such that the probability for the native ion being exchanged for a fertilizer and/or agricultural product cation is high, and the probability of the original cation being reintroduced onto the structural particle 202 is extremely low. Since most fertilizers and/or agricultural products applied in an agricultural or horticultural setting are often a mixture of two or more primary, secondary, and micro nutrients, and that the combinations are many and varied, it is difficult to describe all of the possibilities, but the ions (both positive and negative) supplied by the fertilizer and/or agricultural product may be at least two orders and may be equal to or up to seven orders of magnitude more abundant than the ions available for exchange (both positive and negative) natively occurring on the structural particle 202. Exception to this rule may be when the selected ions 204 in the fertilizer and/or agricultural product supplied have a single charge (especially positive ions) and have an extremely high affinity for the soil particle—in other words, once the selected ions 204 in the fertilizer and/or agricultural product are exchanged with the native mineral ions the negatively (for example) charged soil particle once ionically bound to the fertilizer and/or agricultural product cation (for example) would represent an extremely low energy state such that exchange is extremely unlikely.

In an implementation, the structural particle 202 may comprise one or more of alumina silicate, silicate, aluminum, sodium aluminosilicate or other tuff material. In an implementation, the structural particle 202 comprises one or more of montmorillonite, illite, kaolinite, smectite, zeolite, hydrated sodium calcium aluminosilicate (HSCAS), and vermiculite. In an implementation, the structural particle 202 comprises smectite. In an implementation, the structural particle 202 comprises zeolite. In an implementation, the zeolite structural particle 202 is a carrier of nutrients and other small organic and inorganic molecules via ion exchange and adsorption inside the channels (formed by the crystalline structure). Zeolite channels may carry ions and small molecules used to protect plants, kill plants, or used as plant growth regulators, such as those used to promote plant health, fruiting, growth, or those used to slow plant growth for use by a cell.

Continuing to refer to FIG. 6, the method 600 may further comprise providing an effective amount of water sufficient to effectuate a desired result in a plant and maintain the effective amount of a fertilizer and/or agricultural product and the effective amount of the structural particle 202 in suspension and solution at 606. The effective amount of water may fall within a range of about 0.1 gallon to about 6000 gallons.

The method 600 may further comprise bathing an effective amount of the structural particle 202 in ultrapure water at 608. In an implementation of the method, the step of bathing the effective amount of the structural particle 202 in ultrapure water comprises bathing the structural particle 202 for at least 24 hours. The process of bathing the structural particle 202 may assist in preparing the structural particle 202 by removing native ions 206 and molecules held by water in the channels through diffusion. Ultrapure water may be used to make the ions in the soil substance, structural particle 202, or other organic material readily available for exchange. Thus, when the soil substance, structural particle 202, or other organic material is bathed in ultrapure water, the ions in the structural particle 202 are exposed or otherwise made readily available for ion exchange with another known substance. Thus, in an implementation, the method and system of the disclosure may comprise exchanging cations from the structural particle 202 with selected cations of a known source. For example, in an embodiment, the method 600 comprises bathing an effective amount of the soil substance, the structural particle 202 or other inorganic material directly in the fertilizer or agricultural product. When the soil substance, structural particle 202, or other organic material is bathed in fertilizer or other known or desired source of ions, the ions in the soil substance, structural particle 202, or other organic material are exposed or otherwise made readily available for ion exchange with another known substance.

The method 600 may further comprise heating the structural particle 202 (zeolite) with a heat source to create a dehydrated structural particle 202. In an implementation, the heat source is an oven. In an implementation the heat source is a heat lamp. This step ensures that the zeolite channels are filled with a concentrated fertilizer and/or agricultural product solution. The method 600 shown in FIG. 6 may further comprise creating a pretreated solution by adding the dehydrated structural particle 202 to a concentrated fertilizer and/or agricultural product solution, thus introducing a high concentration of desired ions into the channels and at the ion exchange sites.

Figure 7:
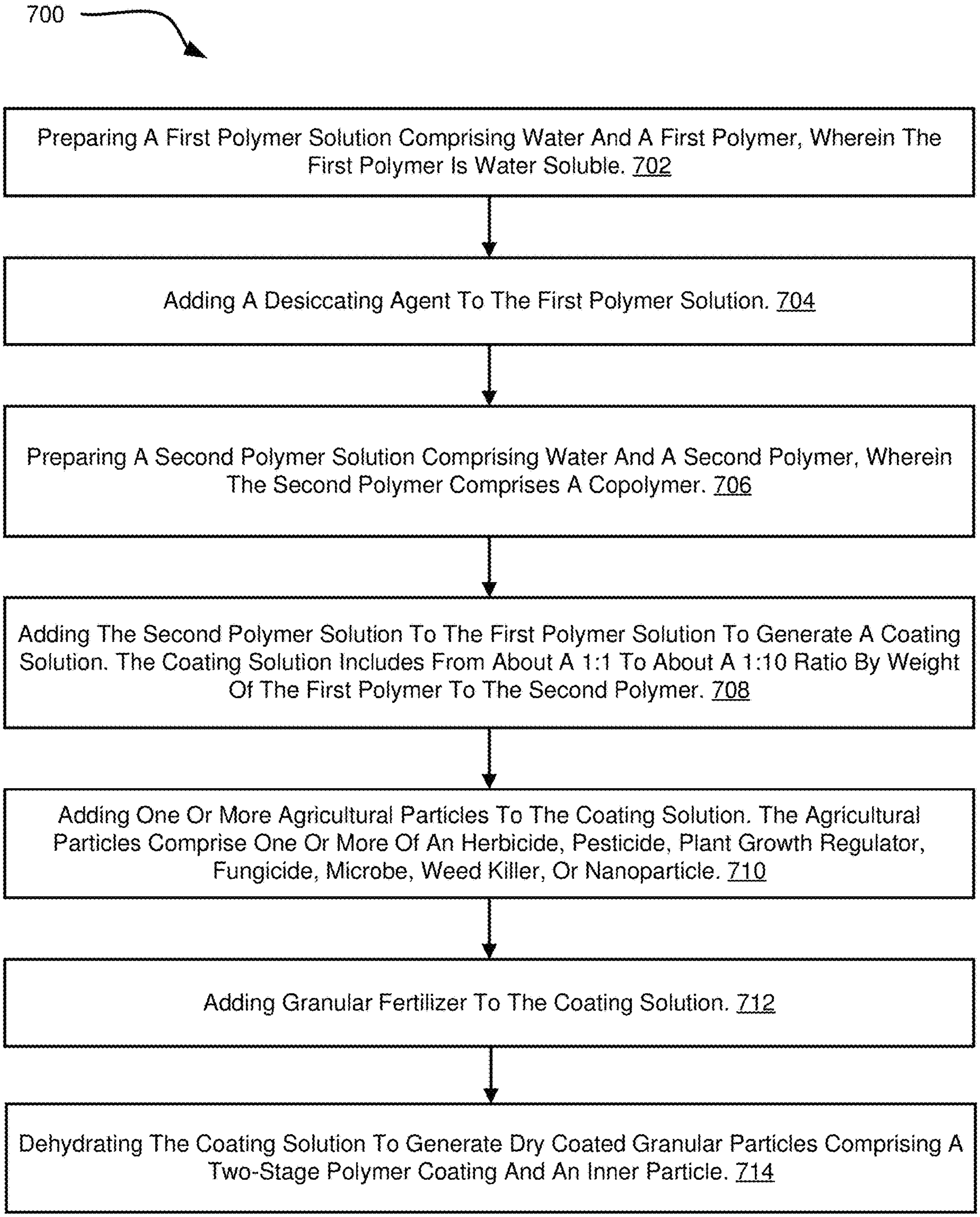
FIG. 7 is a schematic flow chart diagram of a method for manufacturing a coated particle.

FIG. 7 is a schematic flow chart diagram of a method 700 for producing a coated particle 100 as described herein. The method 700 may be implemented to prepare a batch of coated granular fertilizer that may be stored, transported, and applied in a granular state. The coated granular fertilizer described herein may be stored undisturbed for a virtually indefinite amount of time without experiencing degradation. The coated granular fertilizer described herein experiences increased mechanical rigidity and longevity when experiencing physical manipulation during manufacture, transportation, and application.

The method 700 begins with preparing at 702 a first polymer solution comprising water and a water-soluble polymer. The method 700 includes adding at 704 a desiccating agent to the first polymer solution. The method 700 includes preparing a second polymer solution at 706 that includes water and a second polymer, wherein the second polymer is a copolymer. The method 700 includes adding at 708 the second polymer solution to the first polymer solution to generate a coating solution. The coating solution includes from about a 1:1 ratio to about a 1:10 ratio by weight of the first polymer to the second polymer. The method 700 includes adding at 710 one or more agricultural particles to the coating solution. The one or more agricultural particles comprises one or more of an herbicide, pesticides, plant growth regulator, fungicide, weed killer, microbe, or nanoparticle. The nanoparticle may include an ion exchange nanoparticle 200 as described herein. The method 700 includes adding at 712 a granular fertilizer to the coating solution. The method 700 includes dehydrating at 714 the coating solution to generate dry coated granular particles comprising a two-stage polymer coating and an inner particle.

Figure 8:
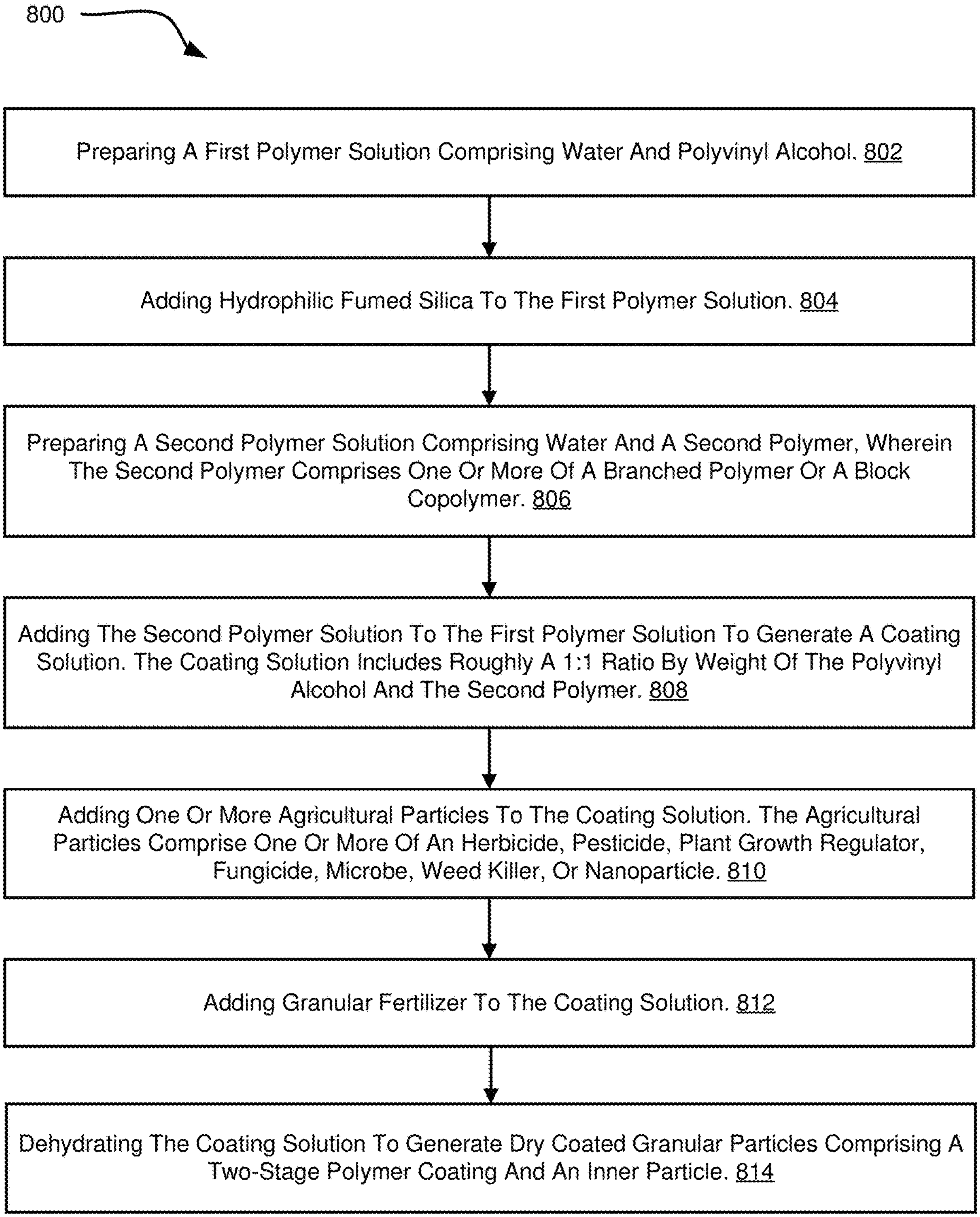
FIG. 8 is a schematic flow chart diagram of a method for manufacturing a coated particle.

FIG. 8 is a schematic flow chart diagram of a method 800 for producing a coated particle 100 as described herein. The method 800 may be implemented to prepare a batch of coated granular fertilizer that may be stored, transported, and applied in a granular state. The coated granular fertilizer described herein may be stored undisturbed for a virtually indefinite amount of time without experiencing degradation. The coated granular fertilizer described herein experiences increased mechanical rigidity and longevity when experiencing physical manipulation during manufacture, transportation, and application.

The method 800 includes preparing at 802 a first polymer solution including water and first polymer. The first polymer may include polyvinyl alcohol (PVA), which may be selected because it enhances soil aggregates and serves as a regenerative wetting agent in the soil. The polyvinyl alcohol serves to continuously retain water within the root region of the plant to enable the plant to experience increased growth with reduced irrigation. The first polymer solution may alternatively include a different polymer such as any suitable water-soluble polymer. The first polymer solution may be prepared with 80-95 wt. % hydrolyzed polyvinyl alcohol having a molecular weight from about 30,000 g/mol to about 70,000 g/mol. The resultant first polymer solution includes from about 1 wt. % to about 10 wt. % polyvinyl alcohol polymer. The polyvinyl alcohol is added to cold water with vigorous agitation. Heat is applied to the solution to complete polymerization of the polyvinyl alcohol.

The method 800 includes adding at 804 hydrophilic fumed silica to the first polymer solution. The resultant first polymer solution may include from about 0.1 wt. % to about 2.0 wt. % of the hydrophilic fumed silica. The hydrophilic fumed silica is added to the first polymer solution and mixed vigorously with moderate heat. The fumed silica serves as a desiccation agent within the eventual two-stage polymer coating 106 surrounding the inner particle 102. When the solution is dehydrated (see step 814), the inner particle 102 may be fully dried by the fumed silica.

The method 800 includes preparing at 806 a second polymer solution comprising water and a second polymer. The second polymer includes one or more of a branched polymer or a block copolymer. In a specific implementation, the second polymer is a polyoxylalkylene copolymer.

The method 800 includes adding at 808 the second polymer solution to the first polymer solution to generate a coating solution. The coating solution is agitated at a temperature of about 20° ° C. to about 45° C. The coating solution includes a roughly 1:1 ratio by weight of the first polymer and the second polymer. This is calculated based on mass (g/mL) of the first polymer and the second polymer. Thus, the relative volumes of the first polymer and the second polymer may differ depending on the densities of each reagent. The coating solution includes equal concentrations of the first polymer and the second polymer within a margin of error of about 10%. In some cases, the coating solution includes from about 1 wt. % to about 5 wt. % of the first polymer, and further includes form about 1 wt. % to about 5 wt. % the second polymer.

The method 800 includes adding at 810 one or more agricultural particles to the coating solution. The agricultural particles comprise one or more of an herbicide, pesticides, plant growth regulator, fungicide, microbe, nanoparticle, and so forth. The method 800 includes adding at 812 granular fertilizer to the coating solution.

The method 800 further includes dehydrating at 814 the coating solution to generate dry coated granular particles comprising a two-stage polymer coating 106 and an inner particle 102. Dehydrating the coating solution may include air drying, dehydrating with an oven, dehydrating with a desiccation agent, and so forth. The hydrophilic fumed silica added at step 804 serves as a desiccating agent within the two-stage polymer coating 106. Thus, the coating 106 may completely dry out with assistance from the fumed silica. This provides increased rigidity around the inner particle 102 to provide enhanced mechanical strength and rigidity. In some cases, the dehydrated coated granular particles include from about 0.1 wt. % to about 5 wt. % of the two-stage polymer coating 106 and include from about 95 wt. % to about 99.9 wt. % the inner particle 102 comprising the granular fertilizer and other agricultural particles.

The method 800 may be adjusted and optimized depending on the desired components of the inner particle 102. Additionally, the method 800 may be adjusted and optimized depending on additional factors, including whether the polymers should be selected to mitigate dust creation, whether the polymers should be selected to increase water retention in the soil, whether the polymers should be selected for quick or delayed degradation when exposed to water, and so forth.

EXAMPLES

The following examples pertain to further embodiments.

Example A is a sequence for preparing a coated particle. The sequence includes preparing a first polymer solution including water, a water-soluble polymer, and a desiccating agent. The sequence includes preparing a second polymer solution including water and a copolymer. The sequence includes adding the first polymer solution to the second polymer solution and stirring at room temperature. The sequence includes adding granular fertilizer particles to the combined solution and stirring. The sequence includes dehydrating the combined solution to generate dry coated granular particles including a two-stage polymer coating.

Example B is a sequence for preparing a coated particle. The sequence includes preparing a two-stage polymer solution including water, a water-soluble polymer, a copolymer, and a desiccating agent. The sequence includes stirring the two-stage polymer solution at room temperature. The sequence includes adding an agricultural product to the two-stage polymer solution, wherein the agricultural product includes an ion exchange nanoparticle. The sequence includes adding granular fertilizer particles to the two-stage polymer solution and dehydrating to generate dry coated granular particles comprising a two-stage polymer coating.

Example C is a sequence for preparing a coated particle. The sequence includes preparing a solution including water and two or more different polymers. The two or more different polymers are selected to improve water retention in soil and improve soil chemistry for fostering plant growth. The sequence includes stirring the solution for 2-24 hours at a temperature above 50° C. The sequence includes adding granular fertilizer particles to the solution and then dehydrating the solution to generate dry coated granular particles comprising a two-stage polymer coating.

Example 1 is a method of preparing a coated particle as described herein. The method includes preparing a PVA polymer using 80-95% hydrolyzed PVA having a molecular weight of about 30,000 to about 70,000 g/mol. The PVA polymer is prepared by adding a sufficient amount of PVA to water with vigorous agitation. The method includes applying heat to the PVA solution to complete polymerization and form the PVA polymer. The PVA polymer may be prepared with a concentration of about 2 wt. % to about 10 wt. %.

Example 2 is a method as in Example 1. The method further includes mixing from about 0.5 wt. % to about 2.0 wt. % aqueous solution of hydrophilic fumed silica into the PVA polymer prepared according to Example 1. The method includes mixing this solution vigorously with moderate heat.

Example 3 is a method as in Examples 1-2. The method further includes adding the PVA polymer (may be referred to as the "first polymer") to a polyoxyalkylene copolymer, or another polymer that can be used as a coating 106 for the coated particle 100 (may be referred to as the "second polymer"). The method includes optimizing the ratio of the first polymer to the second polymer based on the masses of the respective polymers. This is calculated based on the mass (g/mL) of each of the first polymer and the second polymer. The first and second polymers are blended together are a roughly 1:1 ratio based on mass. Thus, the volumes of the first polymer and the second polymer may differ depending on the densities of the polymers. The first polymer and the second polymer may be mixed with constant agitation at a temperature of about 30° C.

Example 4 is a method as in Examples 1-3. The method further includes adding the one or more inner particles 102 to the polymer composition prepared in Example 3. The one or more inner particles 102 may include any of the inner particle 102 components described herein, and may specifically include one or more of fertilizers, pesticides, insecticides, plant growth regulators, nanoparticles, microbes, fungicides, and so forth.

Example 5 is a method as in Examples 1-4. The method includes adding the composition prepared in Example 4 to dry granular fertilizer. The resulting composition including the polymer composition (prepared in Example 3) and the granular fertilizer may be prepared such that the polymer composition is present in an amount from about 0.125 wt. % to about 5.0 wt. % the total resultant composition. The resultant composition is prepared while the dry granular fertilizer is being blended.

Example 6 is a composition. The composition includes an inner particle comprising a fertilizer granule. The composition includes a coating disposed on a surface of the inner particle, wherein the coating comprises a first polymer comprising polyvinyl alcohol (PVA) and a second polymer comprising a block chain copolymer.

Example 7 is a composition as in Example 6, wherein the fertilizer granule comprises one or more of a nitrogenous fertilizer, a phosphate fertilizer, or a potassium fertilizer.

Example 8 is a composition as in any of Examples 6-7, wherein the inner particle further comprises one or more of a pesticide, a fungicide, or an herbicide.

Example 9 is a composition as in any of Examples 6-8, wherein the inner particle further comprises a weed killer.

Example 10 is a composition as in any of Examples 6-9, wherein the fertilizer granule is a component of a nanoparticle comprising: a structural particle comprising an ion exchange site; and the fertilizer granule in a charged state; wherein the ion exchange site of the structural particle is filled with the fertilizer granule in the charged state.

Example 11 is a composition as in any of Examples 6-10, wherein the fertilizer granule is a component of a nanoparticle comprising: a structural particle comprising a plurality of native ion exchange sites; and a plurality of the fertilizer granule in a charged state; wherein at least one of the plurality of the fertilizer granule in the charged state is attached to at least one of the plurality of native ion exchange sites of the structural particle; and wherein the nanoparticle causes a delayed release of the plurality of the fertilizer granule in the charged state.

Example 12 is a composition as in any of Examples 6-11, wherein the coated particle is stored and distributed in a dry granular state.

Example 13 is a composition as in any of Examples 6-12, wherein the coated particle is a component of a fertilizer composition, and wherein the fertilizer composition comprises an effective amount of the polyvinyl alcohol to improve water retention of soil.

Example 14 is a composition as in any of Examples 6-13, wherein the second polymer is attracted to the inner particle by way of one or more of van der Waals forces, London dispersion forces, or quantum attraction.

Example 15 is a composition as in any of Examples 6-14, wherein the second polymer is polyoxylalkylene.

Example 16 is a composition as in any of Examples 6-15, wherein the coated particle is a mesoporous particle comprising pore diameters from about from about 20 μm to about 80 μm.

Example 17 is a composition as in any of Examples 6-16, wherein the coated particle is a component of a fertilizer composition, and wherein the fertilizer composition comprises an effective amount of the second polymer to reduce a release of dust when applying the fertilizer composition to soil.

Example 18 is a composition as in any of Examples 6-17, wherein a thickness of the coating is optimized such that the coated particle comprises an effective amount of the coating to protect the inner particle from environmental exposure and loss.

Example 19 is a composition as in any of Examples 6-18, wherein the coating degrades upon exposure to water.

Example 20 is a composition as in any of Examples 6-19, wherein the degraded coating remains in soil and is not taken up by a plant root.

Example 21 is a composition as in any of Examples 6-20, wherein the inner particle is a nanoparticle comprising a diameter less than or equal to 500 nm, and wherein the inner particle is taken up by the plant root.

Example 22 is a composition as in any of Examples 6-21, wherein the inner particle is a delayed release nanoparticle comprising a plurality of different fertilizer ions, and wherein the delayed release nanoparticle is configured to delay release of the plurality of different fertilizer ions into soil for uptake by the plant root.

Example 23 is a composition as in any of Examples 6-22, wherein the coating comprises from about 40 wt. % to about 60 wt. % the first polymer.

Example 24 is a composition as in any of Examples 6-23, wherein the coating comprises from about 40 wt. % to about 60 wt. % the second polymer.

Example 25 is a composition as in any of Examples 6-24, wherein the coated particle comprises from about 0.1 wt. % to about 4 wt. % of the coating.

Example 26 is a method. The method includes preparing a solution comprising a first polymer comprising polyvinyl alcohol (PVA) and a second polymer comprising a block chain copolymer. The method includes adding a plurality of fertilizer granules to the solution. The method includes blending the solution until at least a portion of the plurality of fertilizer granules are coated with the first polymer and the second polymer.

Example 27 is a method as in Example 26, further comprising preparing the first polymer by preparing a first polymer solution comprising: water; and a hydrolyzed polyvinyl alcohol comprising a molecular weight from about 30,000 g/mol to about 70,000 g/mol; wherein the first polymer solution comprises from about 2 wt. % to about 8 wt. % the polyvinyl alcohol.

Example 28 is a method as in any of Examples 26-27, further comprising adding a hydrophilic fumed silica to the first polymer solution.

Example 29 is a method as in any of Examples 26-28, wherein adding the hydrophilic fumed silica to the first polymer solution comprises adding a sufficient amount such that the first polymer solution comprises from about 0.3 wt. % to about 2.0 wt. % the hydrophilic fumed silica.

Example 30 is a method as in any of Examples 26-29, wherein generating the solution comprises adding the first polymer solution to a second polymer solution, and wherein the first polymer solution comprises from about 2 wt. % to about 10 wt. % the polyvinyl alcohol prior to being added to the second polymer solution.

Example 31 is a method as in any of Examples 26-30, wherein the solution comprises equal parts by weight of the polyvinyl alcohol and the block chain copolymer within a margin of error of about 10%.

Example 32 is a method as in any of Examples 26-31, further comprising adding an agricultural product to the solution, wherein the agricultural product comprises one or more of an herbicide, a pesticide, or a fungicide.

Example 33 is a method as in any of Examples 26-32, further comprising adding an agricultural product to the solution, wherein the agricultural product comprises a weed killer.

Example 34 is a method as in any of Examples 26-33, wherein at least a portion of the plurality of fertilizer granules are disposed within a synthesized nanoparticle comprising: a structural particle comprising an ion exchange site; and the fertilizer granule in a charged state; wherein the ion exchange site of the structural particle is filled with the fertilizer granule in the charged state.

Example 35 is a method as in any of Examples 26-34, wherein at least a portion of the plurality of fertilizer granules are disposed within a synthesized nanoparticle comprising: a structural particle comprising a plurality of native ion exchange sites; and a plurality of the fertilizer granule in a charged state; wherein at least one of the plurality of the fertilizer granule in the charged state is attached to at least one of the plurality of native ion exchange sites of the structural particle; and wherein the nanoparticle causes a delayed release of the plurality of the fertilizer granule in the charged state.

Example 36 is a method as in any of Examples 26-35, wherein the plurality of fertilizer granules comprises one or more of a nitrogenous fertilizer, a phosphate fertilizer, or a potassium fertilizer.

Example 37 is a method as in any of Examples 26-36, wherein adding the plurality of fertilizer granules to the solution comprises adding a sufficient amount such that the solution comprises from about 0.1 wt. % to about 4 wt. % of a combination of the first polymer and the second polymer.

Example 38 is a method as in any of Examples 26-37, further comprising dehydrating the solution to produce a plurality of dry coated fertilizer granules.

Example 39 is a method as in any of Examples 26-38, further comprising applying an effective amount of the plurality of dry coated fertilizer granules to soil to effectuate a desired result in a plant, and further to increase water retention in the soil.

Example 40 is a method as in any of Examples 26-39, wherein the effective amount of the plurality of dry coated fertilizer granules comprises an effective amount of the polyvinyl alcohol to increase the water retention in the soil.

Example 41 is a method as in any of Examples 26-40, wherein the second polymer is polyoxylalkylene.

Example 42 is a method as in any of Examples 26-41, wherein at least a portion of the plurality of fertilizer granules are components of a plurality of mesoporous particles, and wherein the plurality of mesoporous particles comprises pore diameters from about 20 μm to about 80 μm.

Example 43 is a method as in any of Examples 26-42, wherein the second polymer is attracted to at least a portion of the plurality of fertilizer granules by one or more of van der Waals forces, London dispersion forces, or quantum attraction.

Example 44 is a method as in any of Examples 26-43, further comprising optimizing relative quantities of the first polymer, the second polymer, and the plurality of fertilizer granules to form a coating around the plurality of fertilizer granules, wherein the coating comprises the first polymer and the second polymer.

Example 45 is a method as in any of Examples 26-44, wherein the coating degrades upon exposure to water.

Example 46 is a method of preparing a coated particle. The method includes preparing a first polymer solution including water and a first polymer, wherein the first polymer is water soluble. The method includes preparing a second polymer solution including water and a second polymer, wherein the second polymer is a copolymer. The method includes adding the first polymer solution to the second polymer solution to generate a coating solution.

Example 47 is a method as in Example 46, wherein the coating solution comprises from about a 1:1 ratio to about a 1:10 ratio by weight of the first polymer to the second polymer.

Example 48 is a method as in any of Examples 46-47, further comprising adding a plurality of ion exchange nanoparticles to the coating solution.

Example 49 is a method as in any of Examples 46-48, further comprising adding one or more of an herbicide, a pesticide, a fungicide, or a weed killer to the coating solution.

Example 50 is a method as in any of Examples 46-49, further comprising adding a plant growth regulator to the coating solution.

Example 51 is a method as in any of Examples 46-50, further comprising adding a microbe to the coating solution.

Example 52 is a method as in any of Examples 46-51, further comprising adding a plurality of granular fertilizer particles to the coating solution.

Example 53 is a method as in any of Examples 46-52, further comprising dehydrating the coating solution to generate dry coated granular fertilizer particles comprising a two-stage polymer coating.

Example 54 is a method as in any of Examples 46-53, wherein the first polymer is polyvinyl alcohol.

Example 55 is a method as in any of Examples 46-54, wherein the second polymer is a branched polymer.

Example 56 is a method as in any of Examples 46-55, wherein the second polymer is a block copolymer.

Example 57 is a method as in any of Examples 46-56, further comprising adding a desiccating agent to the coating solution.

Example 58 is a method as in any of Examples 46-57, wherein the desiccating agent is hydrophilic fumed silica.

In the foregoing Detailed Description of the Disclosure, various features of the disclosure are grouped together in a single implementation or embodiment for the purpose of streamlining the disclosure. This method of disclosure is not to be interpreted as reflecting an intention that the claimed disclosure requires more features than are expressly recited in each claim. Rather, as the following embodiments reflect, inventive aspects lie in less than all features of a single foregoing disclosed embodiment. Thus, the following embodiments are hereby incorporated into this Detailed Description of the Disclosure by this reference, with each embodiment standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, ratios of elements or molecules, function and manner of operation, assembly and use may be made without departing from the principles and concepts set forth herein.

What is claimed is:

1. A method comprising:

preparing a solution comprising:

a first polymer that is water soluble;

a second polymer comprising a copolymer; and a plurality of fertilizer granules; and blending the solution until at least a portion of the plurality of fertilizer granules are coated with the first polymer and the second polymer.

2. The method of claim 1, further comprising preparing the first polymer by preparing a first polymer solution comprising:

water; and a hydrolyzed polyvinyl alcohol comprising a molecular weight from about 30,000 g/mol to about 70,000 g/mol;

wherein the first polymer solution comprises from about 2 wt. % to about 8 wt. % the polyvinyl alcohol.

3. The method of claim 2, further comprising adding a desiccating agent to the first polymer solution.

4. The method of claim 3, wherein the desiccating agent is hydrophilic fumed silica, and wherein adding the hydrophilic fumed silica to the first polymer solution comprises adding a sufficient amount such that the first polymer solution comprises from about 0.3 wt. % to about 2.0 wt. % the hydrophilic fumed silica.

5. The method of claim 2, wherein generating the solution comprises adding the first polymer solution to a second polymer solution, and wherein the first polymer solution comprises from about 2 wt. % to about 10 wt. % the first polymer prior to being added to the second polymer solution.

6. The method of claim 1, wherein the first polymer is polyvinyl alcohol (PVA).

7. The method of claim 6, wherein the second polymer is a block chain copolymer.

8. The method of claim 1, wherein the solution further comprises a desiccating agent, and wherein the method further comprises dehydrating the solution to produce a plurality of dry coated fertilizer granules.

9. The method of claim 8, further comprising applying an effective amount of the plurality of dry coated fertilizer granules to improve maturation of a plant, and further to increase water retention in the soil, wherein the effective amount of the plurality of dry coated fertilizer granules comprises an effective amount of the first polymer to increase the water retention in the soil.

10. The method of claim 1, wherein the solution comprises equal parts by weight of the first polymer and the second polymer within a margin of error of about 10%;

wherein the solution comprises from about 95 wt. % to about 99.9 wt. % the plurality of fertilizer granules; and wherein the first polymer and the second polymer form a two-stage polymer coating around the plurality of fertilizer granules.

11. The method of claim 10, wherein the two-stage polymer coating degrades upon exposure to water.

12. The method of claim 1, wherein the solution comprises equal parts by weight of the first polymer and the second polymer within a margin of error of about 10%.

13. The method of claim 1, further comprising adding an agricultural product to the solution, wherein the agricultural product comprises one or more of an herbicide, a pesticide, a fungicide, or a weed killer.

14. The method of claim 1, wherein at least a portion of the plurality of fertilizer granules are disposed within a synthesized nanoparticle comprising:

a structural particle comprising an ion exchange site; and the fertilizer granule in a charged state;

wherein the ion exchange site of the structural particle is filled with the fertilizer granule in the charged state.

15. The method of claim 1, wherein at least a portion of the plurality of fertilizer granules are disposed within a synthesized nanoparticle comprising:

a structural particle comprising a plurality of native ion exchange sites; and a plurality of the fertilizer granule in a charged state;

wherein at least one of the plurality of the fertilizer granule in the charged state is attached to at least one of the plurality of native ion exchange sites of the structural particle; and wherein the nanoparticle causes a delayed release of the plurality of the fertilizer granule in the charged state.

16. The method of claim 1, wherein the plurality of fertilizer granules comprises one or more of a nitrogenous fertilizer, a phosphate fertilizer, or a potassium fertilizer.

17. The method of claim 1, wherein the solution comprises from about 0.1 wt. % to about 4 wt. % of a combination of the first polymer and the second polymer.

18. The method of claim 1, wherein the second polymer is polyoxylalkylene.

19. The method of claim 1, wherein at least a portion of the plurality of fertilizer granules are components of a plurality of mesoporous particles, and wherein the plurality of mesoporous particles comprises pore diameters from about 20 μm to about 80 μm.

20. The method of claim 1, wherein the second polymer is attracted to at least a portion of the plurality of fertilizer granules by one or more of van der Waals forces, London dispersion forces, or quantum attraction.

21. A method comprising:

preparing a solution comprising:

a first polymer that is water soluble;

a second polymer comprising a copolymer; and a plurality of fertilizer granules; and blending the solution until at least a portion of the plurality of fertilizer granules are coated with the first polymer and the second polymer;

wherein the solution comprises equal parts by weight of the first polymer and the second polymer, within a margin of error of about 10%.

* * * * *